(12) United States Patent
Chang (10) Patent No.: US 7,744,716 B2
(45) Date of Patent: Jun. 29, 2010

(54) METHOD FOR MAKING WATER-PROOF LAMINATES FROM WOOD

(76) Inventor: Shu-Hui Chang, No.330, Sec. 1, Fongshih Rd., Fongyuan City, Taichung County (TW)

( * ) Notice: Subject to any disclaimer, the term of this patent is extended or adjusted under 35 U.S.C. 154(b) by 656 days.

(21) Appl. No.: 11/674,724

(22) Filed: Feb. 14, 2007

(65) Prior Publication Data

US 2008/0191385 A1 Aug. 14, 2008

(51) Int. Cl.
*B29C 47/02* (2006.01)
*B29C 47/10* (2006.01)
*B29C 47/78* (2006.01)
*B32B 27/40* (2006.01)
*B32B 37/24* (2006.01)
*B29C 47/06* (2006.01)
*B29C 47/96* (2006.01)
*B32B 37/12* (2006.01)

(52) U.S. Cl. ............. 156/244.12; 156/242; 156/244.11; 156/244.27; 156/245; 264/259; 264/263; 264/271.1; 264/275; 264/278; 264/319; 264/328.1

(58) Field of Classification Search .............. 264/259, 264/263, 271.1, 275, 278, 319, 328.1; 156/242, 156/244.11, 244.12, 244.27, 245, 500

See application file for complete search history.

(56) References Cited

U.S. PATENT DOCUMENTS

| 3,481,810 | A | * | 12/1969 | Waite .......................... 156/242 |
| 4,028,450 | A | * | 6/1977 | Gould ........................ 264/45.5 |
| 4,798,549 | A | * | 1/1989 | Hirsch ......................... 441/74 |
| 5,017,319 | A | | 5/1991 | Shen |
| 5,798,162 | A | * | 8/1998 | Bank ........................... 428/76 |
| 6,349,754 | B1 | * | 2/2002 | Johnson et al. ............. 156/221 |
| 6,544,454 | B1 | * | 4/2003 | Chen ..................... 264/171.13 |
| 6,589,660 | B1 | * | 7/2003 | Templeton et al. .......... 428/452 |
| 6,878,199 | B2 | * | 4/2005 | Bowden et al. .......... 106/162.5 |
| 2003/0107145 | A1 | * | 6/2003 | Ozasa et al. ............... 264/46.9 |
| 2003/0153404 | A1 | * | 8/2003 | Kennedy et al. ............ 473/371 |

* cited by examiner

*Primary Examiner*—Philip C Tucker
*Assistant Examiner*—Sonya Mazumdar
(74) *Attorney, Agent, or Firm*—Alan Kamrath; Kamrath & Associates PA (57) ABSTRACT

A method for making a water-proof laminate from wood, includes a lower mold. A lower cover is provided in the lower mold. A wood plate is provided on the lower cover in the lower mold. An upper cover is provided on the wood plate. An upper mold is provided for pressing the lower cover, the wood plate and lower cover against the lower mold. A coating is injected into the upper and lower molds to cover at least the edges of the upper mold, wood plate and lower mold so that a water-proof laminate is finished after the curing of the coating. The upper mold is moved from the lower mold, and the water-proof laminate is moved from the lower mold.

16 Claims, 10 Drawing Sheets

METHOD FOR MAKING WATER-PROOF LAMINATES FROM WOOD

BACKGROUND OF INVENTION

1. Field of Invention

The present invention relates to a method for making water-proof laminates from wood.

2. Related Prior Art

Disclosed in U.S. Pat. No. 5,017,319 is a conventional method for making composite products from lignocellulosic materials. In this conventional method, lignocellulosic material is provided that includes at least 10% of hemi-cellulose. The lignocellulosic material is heated at a certain temperature for a certain period to decompose and hydrolyze the hemi-cellulose into un-polymerized water-soluble resin material. The resin material is heated and pressed against a surface at a certain temperature for a certain period to polymerize, crosslink and thermoset the resin material so that the resin material is attached to the surface. This method, however, requires complicated and expensive equipment. The resultant product of this method is inevitably expensive.

The present invention is therefore intended to obviate or at least alleviate the problems encountered in the prior art.

SUMMARY OF INVENTION

According to the present invention, a method is provided for making a water-proof laminate from wood. In the method, a lower mold is provided. A lower cover is provided in the lower mold. A wood plate is provided on the lower cover in the lower mold. An upper cover is provided on the wood plate. An upper mold is provided for pressing the lower cover, the wood plate and lower cover against the lower mold. A coating is injected into the upper and lower molds to cover at least the edges of the upper mold, wood plate and lower mold so that a water-proof laminate is finished after the curing of the coating. The upper mold is moved from the lower mold, and the water-proof laminate is moved from the lower mold.

An advantage of the method according to the present invention is low cost in equipment, since it allows the use of an inexpensive traditional molding machine.

Another advantage of the method according to the present invention is low cost in material, since the covers and wood plate are available at low prices.

Still another advantage of the method according to the present invention is low cost in manufacturing, since it involves only a few simple steps.

Other advantages and features of the present invention will become apparent from the following description referring to the drawings.

BRIEF DESCRIPTION OF DRAWINGS

The present invention will be described through detailed illustration of the preferred embodiment referring to the drawings.

DETAILED DESCRIPTION OF PREFERRED EMBODIMENTS

Figure 1:
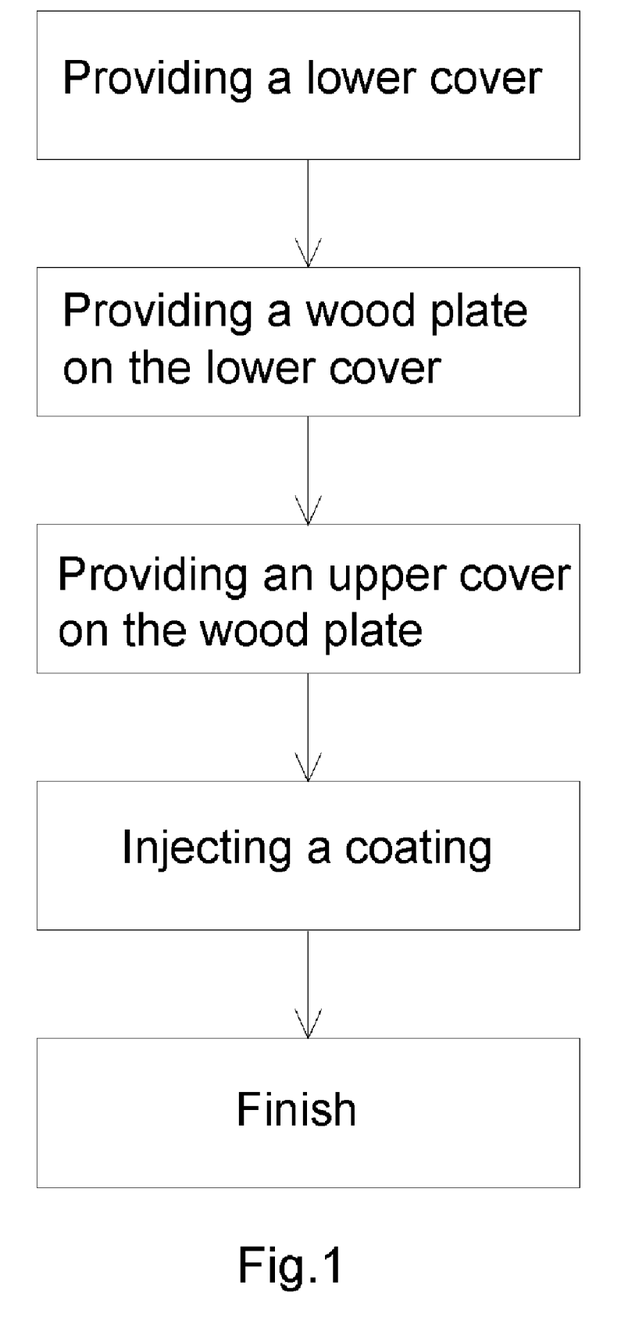
FIG. 1 is a flowchart of a method for making water-proof laminates from wood according to the preferred embodiment of the present invention.

Referring to FIG. 1, a flowchart is given to a method for making water-proof laminates according to the preferred embodiments of the present invention.

Figure 2:
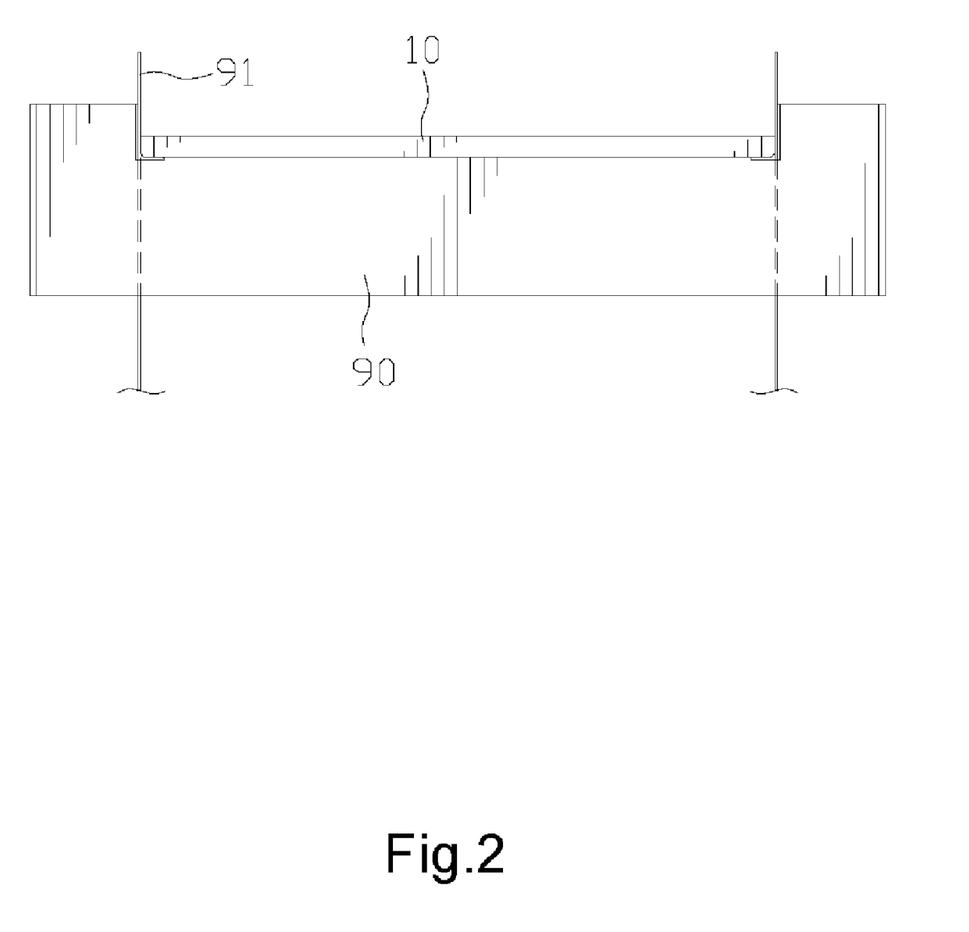
FIG. 2 is a cross-sectional view of a lower cover disposed in a lower mold used in the method shown in FIG. 1.

Referring to FIGS. 1 and 2, a lower mold 90 is provided. Rods 91 are inserted through the lower mold 90. A lower cover 10 is disposed in the lower mold 90. The lower cover 10 is precisely positioned by the rods 91. The edge of the lower cover 10 is kept from the wall of the lower mold 90 by the rods 91.

The lower cover 10 is made of polypropylene, polyethylene terephthalate or the like to provide an excellent water-proof effect. The lower cover 10 may include an additive so that it may be water-proof. The lower cover 10 may include one or more layers. The lower cover 10 may be made with various thicknesses and shapes.

Figure 3:
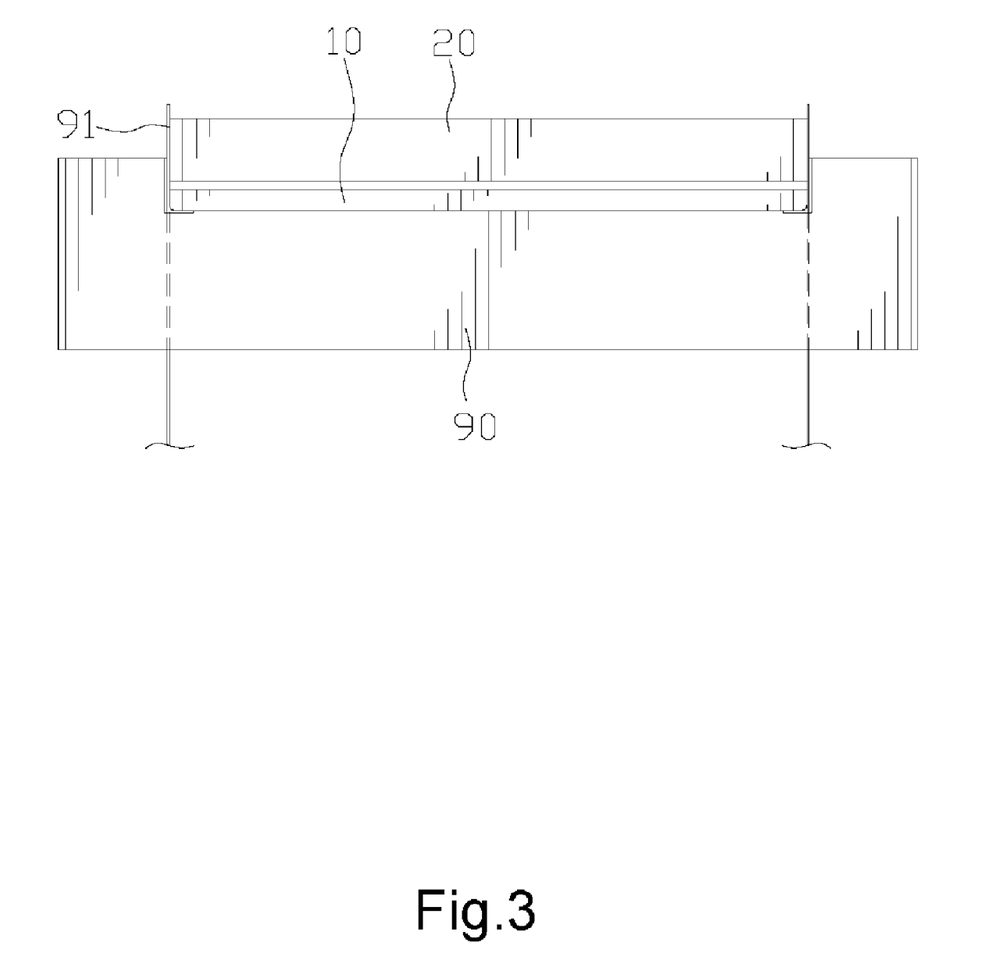
FIG. 3 is a cross-sectional view of a wood plate disposed on the lower cover shown in FIG. 2.

Referring to FIGS. 1 and 3, a wood plate 20 is disposed on the lower cover 10 within the lower mold 90. Adhesive may be provided between the wood plate 20 and the lower cover 10. The wood plate 20 is precisely positioned by the rods 91. The edge of the wood plate 20 is kept from the wall of the lower mold 90 by the rods 91.

The wood plate 20 may be a polymer plate, particle board, fiberboard, plywood, oriented strand board or medium density fiberboard. The wood plate 20 may include one or more layers.

Figure 4:
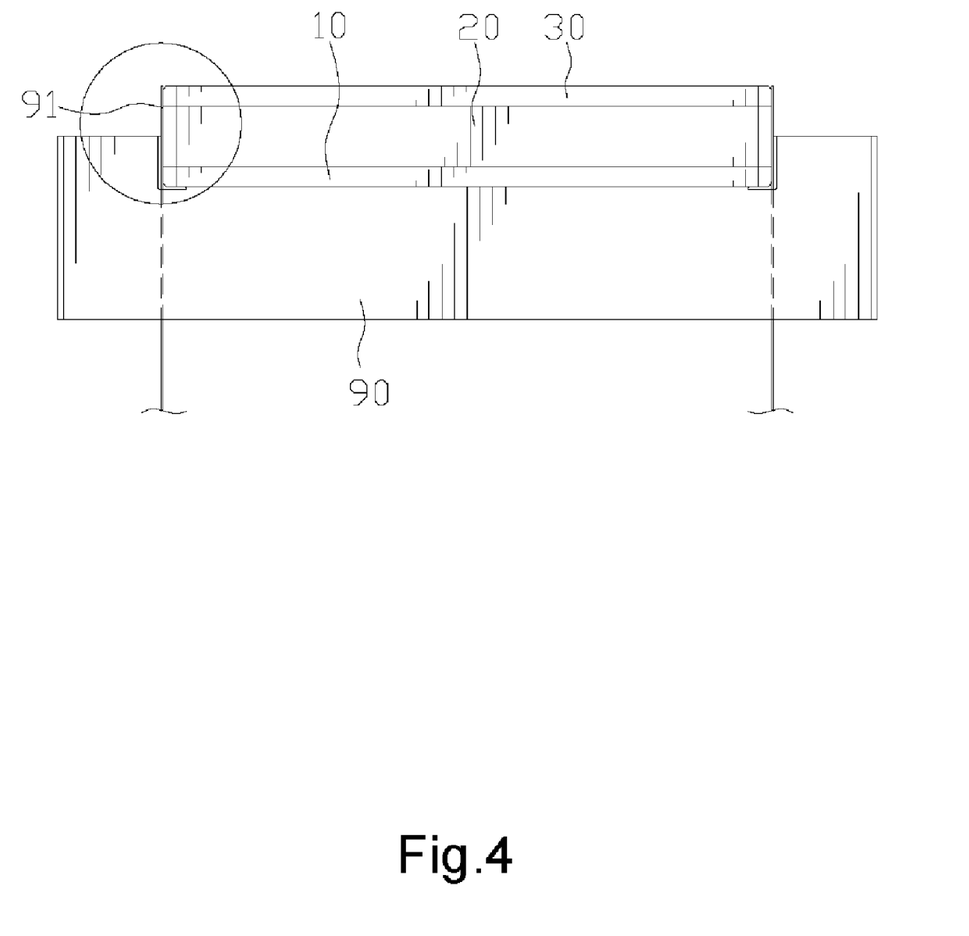
FIG. 4 is a cross-sectional view of an upper cover disposed on the wood plate shown in FIG. 3.
Figure 5:
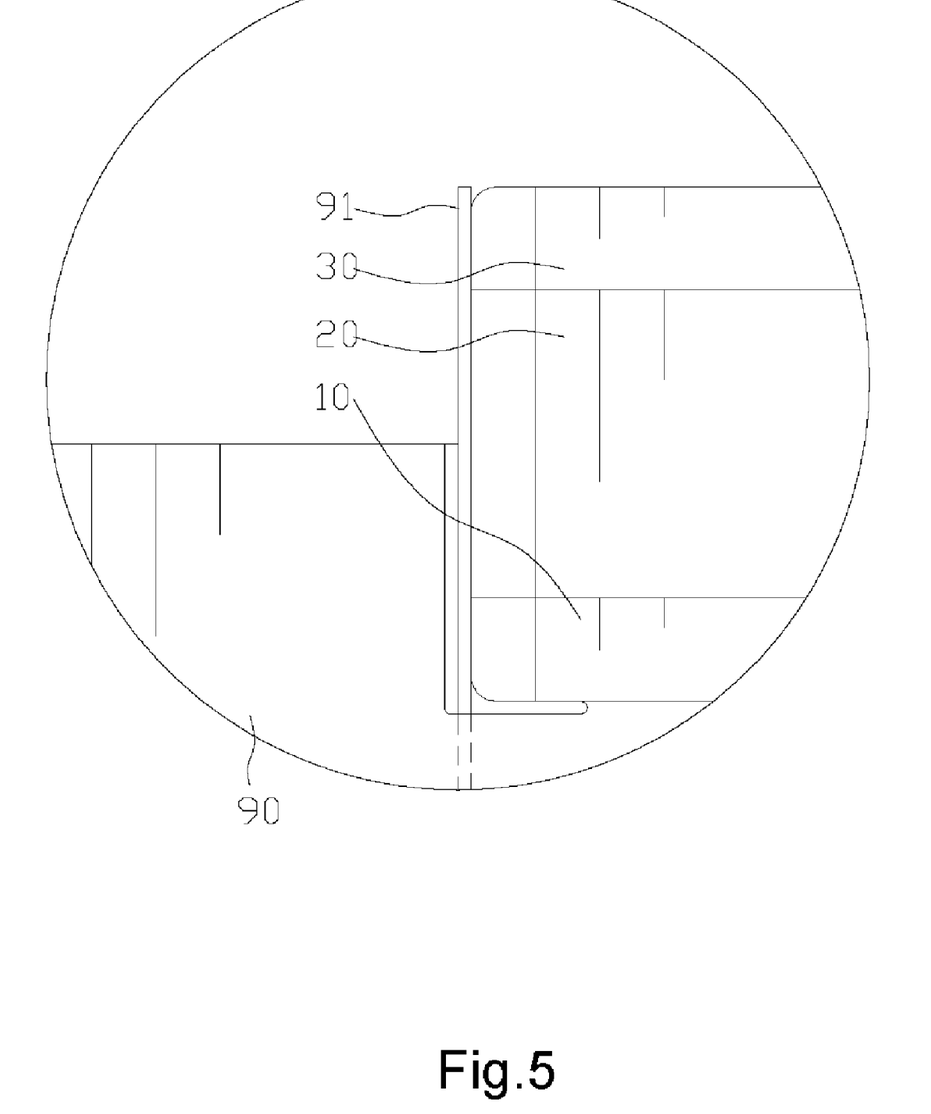
FIG. 5 is an enlarged partial view of the stack shown in FIG. 4.

Referring to FIGS. 1 and 4, a upper cover 30 is disposed on the wood plate 20. Adhesive may be provided between the upper cover 30 and the wood plate 20. The upper cover 30, the wood plate 20 and the lower cover 10 together form a stack. The upper cover 30 is precisely positioned by the rods 91. As best shown in FIG. 5, there is a gap between the wall of the lower mold 90 and the rods 91.

Figure 6:
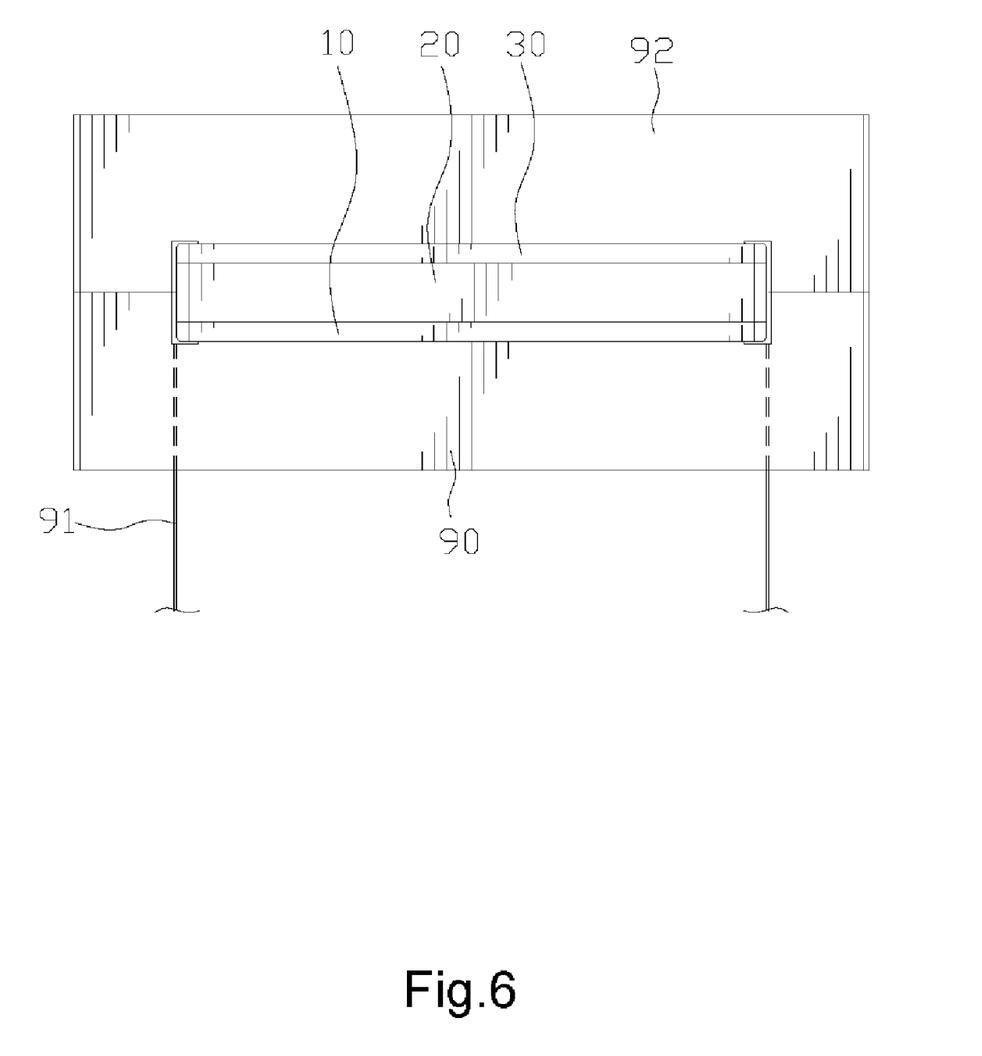
FIG. 6 is a cross-sectional view of an upper mold for pressing the stack against the lower mold shown in FIG. 4.

Referring to FIGS. 1 and 6, an upper mold 92 is disposed on the lower mold 90. The upper mold 92 and the lower mold 90 together form a mold set. The stack is compressed between the upper mold 92 and the lower mold 90. The rods 91 are retreated so that the upper ends thereof are flush with the floor of the lower mold 90.

The upper cover 30 may be made of polypropylene, polyethylene terephthalate or the like to provide an excellent water-proof effect. A fire-proof agent may be added into the upper cover 30 so that the upper cover 30 may be fire-proof. The upper cover 30 may include one or more layers. The upper cover 30 may be made with various thicknesses and shapes.

Figure 7:
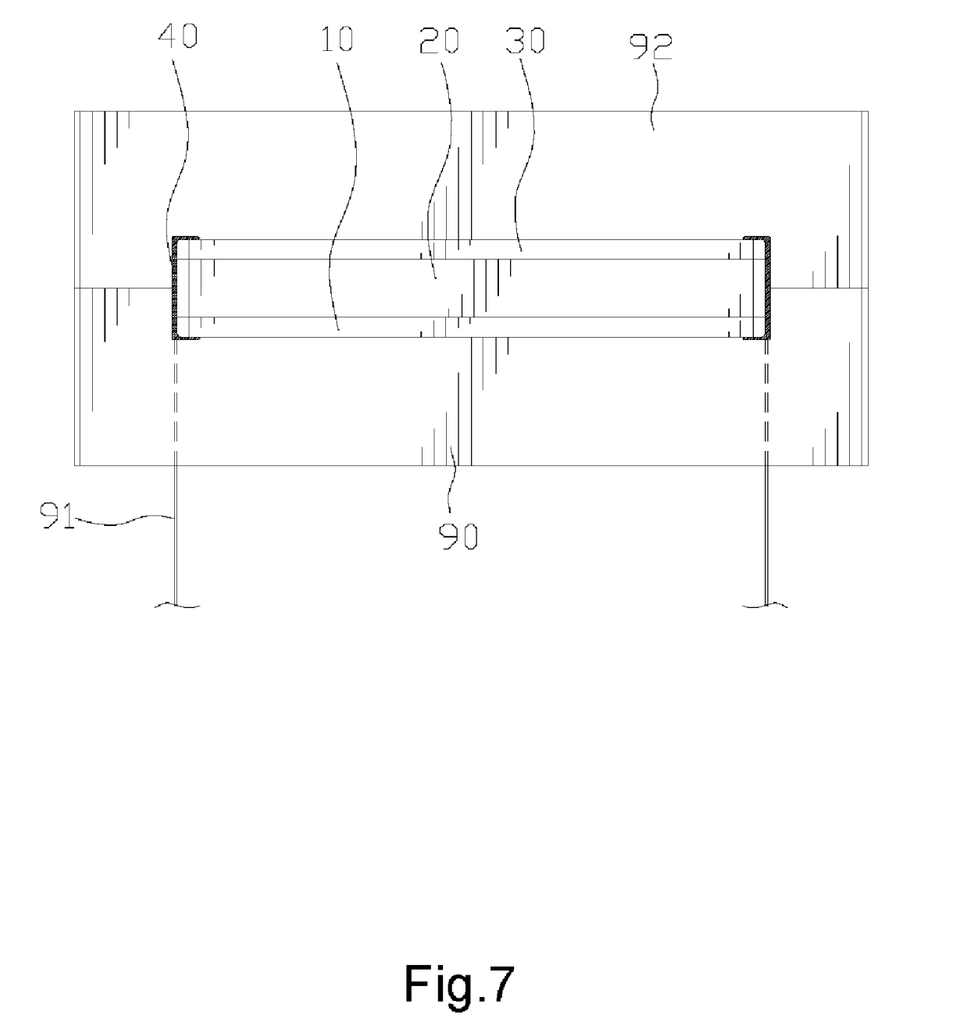
FIG. 7 is a cross-sectional view of a water-proof laminate with a wrapper for wrapping the stack shown in FIG. 6.

Referring to FIGS. 1 and 7, coating 40 is injected into a space defined between the mold set and the stack. The coating 40 covers the edges of the upper cover 30, the wood plate 20 and the lower cover 10, the margin of the top of the upper cover 30 and the margin of the bottom of the lower cover 10.

The coating 40 is made of material that can be firmly adhered to upper cover 30, the wood plate 20 and the lower cover 10 to provide an excellent water-proof effect. Examples of the material of the coating 40 include, but are not limited to, polypropylene, polyethylene terephthalate, polyethylene and acrylonitrile-butadiene-styrene.

Figure 8:
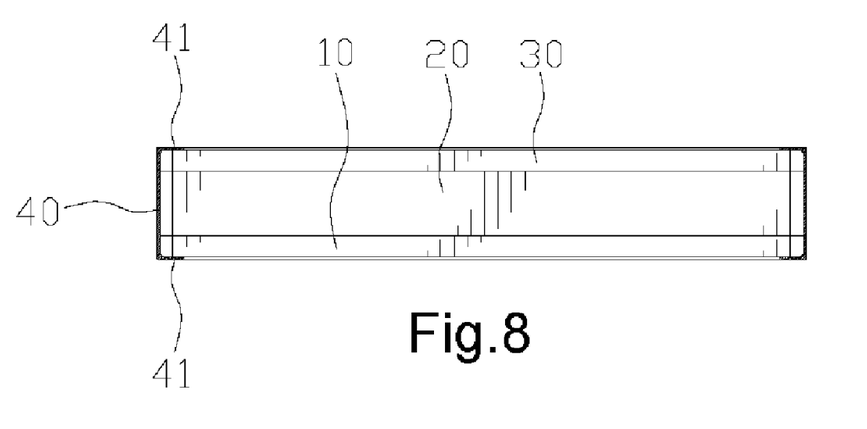
FIG. 8 is a cross-sectional view of the water-proof laminate shown in FIG. 7.
Figure 9:
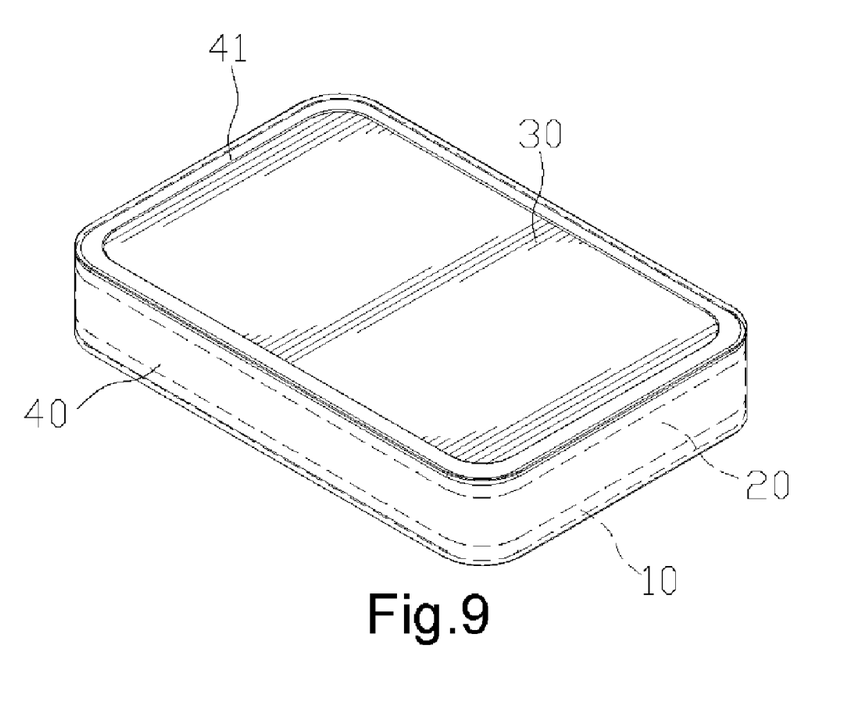
FIG. 9 is a perspective view of the water-proof laminate of FIG. 8.

Referring to FIGS. 8 and 9, after the curing of the coating 40, the final product of a water-proof laminate 41 according to the present invention is finished. The upper mold 92 is moved from the lower mold 90 so that the water-proof laminate 41 can be moved from the lower mold 92.

Figure 10:
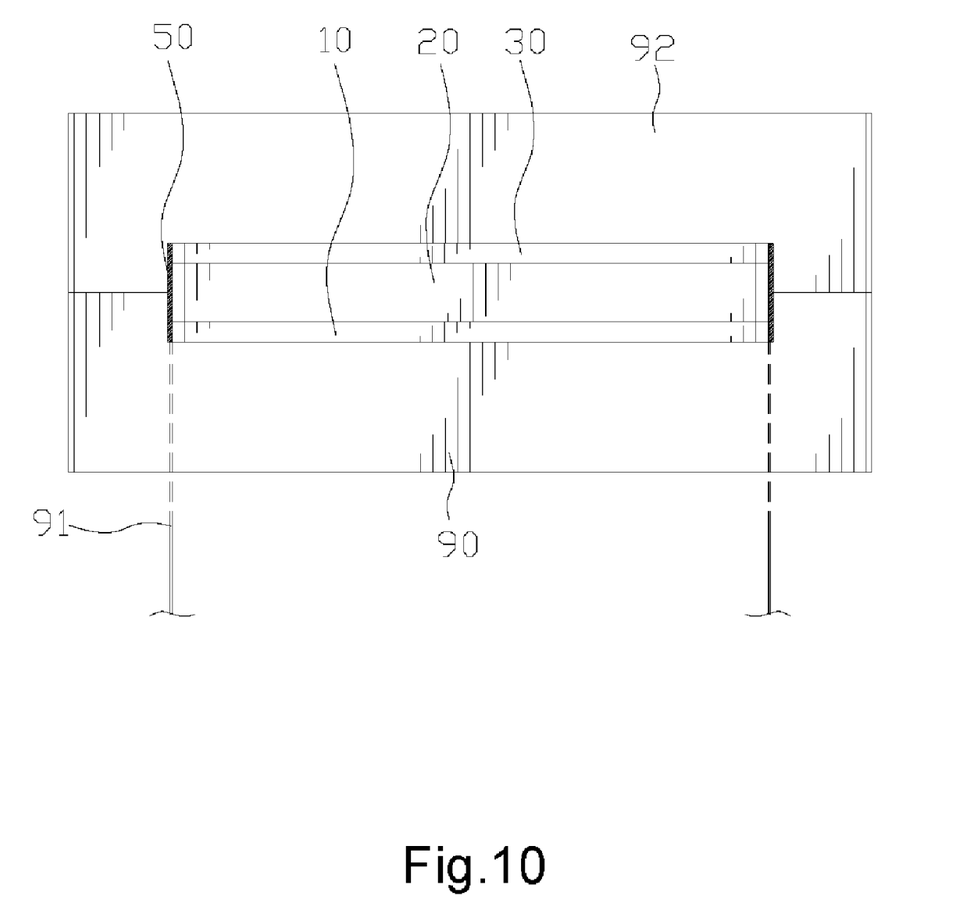
FIG. 10 is a cross-sectional view of a water-proof laminate according to another embodiment of the present invention.
Figure 11:
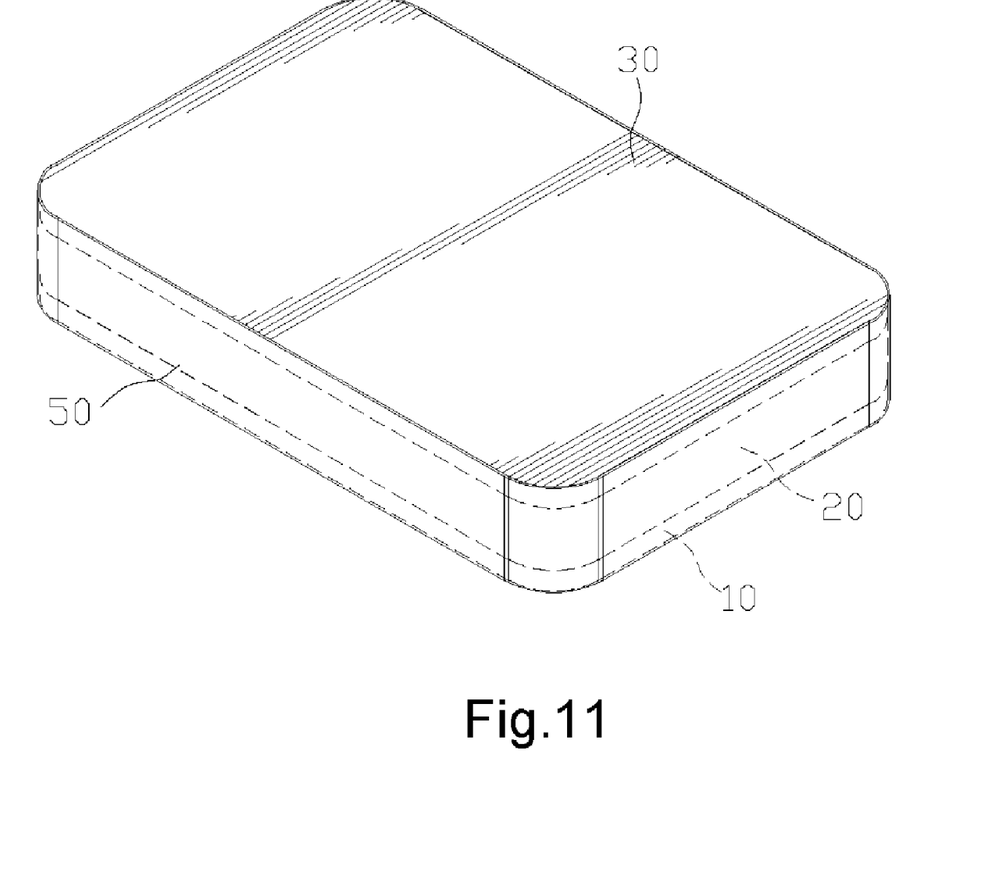
FIG. 11 is a perspective view of the water-proof laminate of FIG. 10.

Referring to FIGS. 10 and 11, there is shown a water-proof laminate 50 according to another embodiment of the present invention. The water-proof laminate 50 shown in FIGS. 10 and 11 is identical to the water-proof laminate 41 shown in FIGS. 8 and 9 except that the coating 40 does not cover the top of the upper cover 30 and the bottom of the lower cover 10.

The method for making water-proof laminates according to the present invention exhibits several advantages. Firstly, the cost in equipment is low, since it allows the use of an inexpensive traditional molding machine.

Secondly, the cost in material is low, since the covers and wood plate are available at low prices.

Thirdly, the cost in manufacturing is low, since it involves only a few simple steps.

The present invention has been described through the illustration of the preferred embodiments. Those skilled in the art can derive variations from the preferred embodiments without departing from the scope of the present invention. Therefore, the preferred embodiments shall not limit the scope of the present invention defined in the claims.

What is claimed is:

1. A method for making a water-proof laminate from wood, the method comprising:
   providing a lower mold;
   providing a lower cover in the lower mold;
   providing a wood plate on the lower cover in the lower mold;
   providing an upper cover on the wood plate;
   inserting rods through the lower mold for precisely positioning the upper cover, wood plate and lower cover;
   providing an upper mold for pressing the upper cover, the wood plate and lower cover against the lower mold;
   injecting a coating into the upper and lower molds to cover at least edges of the upper cover, wood plate and lower cover so that a water-proof laminate is finished after curing of the coating;
   retreating the rods before injecting the coating into the upper and lower molds; and
   moving the upper mold from the lower mold and moving the water-proof laminate from the lower mold.

2. The method according to claim 1 further comprising providing adhesive between the wood plate and the lower cover before providing the wood plate on the lower cover.

3. The method according to claim 1 further comprising providing adhesive between the upper cover and the wood plate before providing the upper cover on the wood plate.

4. The method according to claim 1 wherein the upper cover comprises at least one layer.

5. The method according to claim 1 wherein the wood plate comprises at least one layer.

6. The method according to claim 1 wherein the lower cover comprises at least one layer.

7. The method according to claim 1 wherein the upper cover has various thicknesses.

8. The method according to claim 1 wherein the wood plate has various thicknesses.

9. The method according to claim 1 wherein the lower cover has various thicknesses.

10. The method according to claim 1 wherein the upper cover is made of a material selected from a group consisting of polypropylene and polyethylene terephthalate.

11. The method according to claim 10 further comprising adding a fire-proof agent into the material of the upper cover so that the upper cover is fire-proof.

12. The method according to claim 1 wherein the lower cover is made of material selected from a group consisting of polypropylene and polyethylene terephthalate.

13. The method according to claim 12 further comprising adding a fire-proof agent into the material of the lower cover so that the lower cover is fire-proof.

14. The method according to claim 1 wherein the wood plate is selected from a group consisting of a polymer plate, particle board, fiberboard, plywood, oriented strand board or medium density fiberboard.

15. The method according to claim 1 wherein the coating is made of material selected from a group consisting of polypropylene, polyethylene terephthalate, polyethylene and acrylonitrile-butadiene-styrene.

16. The method according to claim 1 wherein the coating further covers a portion of a top of the upper cover and a portion of a bottom of the lower cover.

* * * * *